United States Patent
Allan et al.

(10) Patent No.: US 6,788,696 B2
(45) Date of Patent: Sep. 7, 2004

(54) TRANSPARENT QOS USING VC-MERGE CAPABLE ACCESS MODULES

(75) Inventors: David Ian Allan, Ottawa (CA); Diana Joan Wilhelm, Woodlawn (CA)

(73) Assignee: Nortel Networks Limited, St. Laurent (CA)

(*) Notice: Subject to any disclaimer, the term of this patent is extended or adjusted under 35 U.S.C. 154(b) by 698 days.

(21) Appl. No.: 09/750,267

(22) Filed: Dec. 29, 2000

(65) Prior Publication Data

US 2001/0048683 A1 Dec. 6, 2001

Related U.S. Application Data

(60) Provisional application No. 60/188,461, filed on Mar. 10, 2000.

(51) Int. Cl.[7] .............................................. H04L 12/28
(52) U.S. Cl. ..................... 370/411; 370/230; 370/392; 370/352; 370/395.52; 370/395.53; 370/466; 370/401
(58) Field of Search .............................. 370/230.1, 237, 370/252, 349, 352–356, 389, 390, 392, 395.1, 395.21, 395.42, 395.5, 395.53, 397, 401, 432, 466, 537, 395.52; 709/223, 225, 229

(56) References Cited

U.S. PATENT DOCUMENTS

| 5,555,244 | * | 9/1996 | Gupta et al. ................. 370/397 |
| 5,825,772 | | 10/1998 | Dobbins et al. ............ 370/396 |
| 5,831,975 | | 11/1998 | Chen et al. .................. 370/256 |
| 5,835,723 | | 11/1998 | Andrews et al. |
| 5,940,391 | | 8/1999 | Malkin et al. ............... 370/390 |
| 6,118,785 | * | 9/2000 | Araujo et al. ............... 370/401 |
| 6,233,618 | * | 5/2001 | Shannon ..................... 709/229 |
| 6,331,983 | * | 12/2001 | Haggerty et al. ........... 370/400 |
| 6,345,051 | * | 2/2002 | Gupta et al. ............. 370/395.2 |
| 6,658,002 | * | 12/2003 | Ross et al. ................... 370/392 |
| 6,683,873 | * | 1/2004 | Kwok et al. ................ 370/389 |

* cited by examiner

*Primary Examiner*—Hassan Kizou
*Assistant Examiner*—Alan V. Nguyen
(74) *Attorney, Agent, or Firm*—Max R. Wood; Ogilvy Renault

(57) ABSTRACT

A method and a system for providing transparent Quality of Service (QoS) and reducing bandwidth usage in an ATM access network uses that uses VC-merging and delivery of content directly through the access network. Root-initiated join proxy messages sent from a service gateway include a merge-eligibility indicator that prompts an access module to merge content delivered through the access networks into a virtual circuit link (VCL) provisioned for the subscriber. TCP splicing is also supported to further improve overall QoS.

27 Claims, 4 Drawing Sheets

TRANSPARENT QOS USING VC-MERGE CAPABLE ACCESS MODULES

CROSS-REFERENCE TO RELATED APPLICATIONS

This application claims the benefit of United States Provisional Application No. 60/188,461, filed Mar. 10, 2000.

MICROFICHE APPENDIX

Not applicable.

TECHNICAL FIELD

The present invention relates in general to the provision of broadband services using a Digital Subscriber Loop (DSL) platform and, in particular, to a network service model that supports transparent QoS using VC-merge capable access modules, for delivering broadband services to Customer Premise Equipment (CPEs).

BACKGROUND OF THE INVENTION

As traffic volume on the Internet continues to rapidly expand, the demand for bandwidth-intensive applications is also increasing. Demand for higher bandwidth, in turn, requires higher forwarding performance (packets per second) by routers, for both multi-cast and unicast traffic. Multicast services distribute, for example, news, entertainment or educational content, which is transported over the network from source nodes to a plurality of sink nodes. The source nodes are typically multicast servers, such as an Internet Protocol (IP) server connected to an IP multicast data network. The sink node, or CPE, is typically an end user's communication device, such as, a personal computer (PC) connected to the network via a modem.

For high bandwidth applications, the use of high-speed Digital Subscriber Line (DSL) technology, cable modems, satellite systems, and the like, are becoming increasingly popular as a means of coupling Customer-Premise Equipment (CPE), such as personal computers or Local Area Network (LAN) servers with the communications network. DSL provides access to the Internet through a high speed Asynchronous Transfer Mode (ATM) access network, facilitating high bandwidth data transfer and providing for the possibility of application integrated quality of service.

Multicast data from a source node is typically routed to the ATM access network through an Internet Protocol (IP) Service Gateway (SG). Each Customer Premise Equipment (CPE) is normally connected to the ATM access network via an access module (e.g., a Digital Subscriber Loop Access Multiplexer (DSLAM), a cable headend, a wireless headend, a satellite base station, an optical line termination or an ATM side of the CPE).

Requests for the same multicast information, originating from two or more participating CPEs served by the same access module, results in multiple copies of the multicast data being routed through the ATM access network between the Service Gateway (SG) and the access module. This can cause degradation of performance due to bandwidth exhaustion and places an unreasonable burden on the Service Gateway (which typically performs complex packet inspection functions not required for streaming media). Furthermore, the QoS associated with the VCs serving the respective CPEs for basic service is inherited by the multicast packets affecting the rate of transfer of the packets across the ATM access network, and degrading the performance such that expected service levels cannot be sustained.

In order to overcome this problem and to reduce the duplication of traffic within the ATM access network, it is desirable to use additional ATM VCCs to augment basic connectivity to the service gateway for the transport of specific services. These are in the form of p2p connections between ATM attached content servers for unique services and ATM point-to-multipoint (p2mp) connections for multicast services. Similarly to minimize the complexity deployed in the subscriber end systems VCs are merged together or PDU interleaved using various methods known in the art. This permits dynamic "per service" QoS to be extended to end systems that do not support ATM call processing.

In Applicant's co-pending U.S. patent application Ser. No. 09/648,610, filed on Aug. 28, 2000 and entitled IP MULTICAST SERVICES OVER ATM MULTICAST, a method for grafting a sink node (leaf) to an Internet Service (multicast tree) created by the Service Gateway is described. The Service Gateway establishes a special virtual connection between the two through the ATM network when there are requests from various CPEs for particular multicast data. Duplication of multicast data traffic through the ATM network is thereby reduced and performance is improved.

When a Service Gateway receives messages from a plurality of sink nodes (i.e. CPEs) requesting the same multicast data, the Service Gateway identifies the appropriate access module and the CPEs are then grafted to the multicast tree at the access module. The access module performs a VC-merge operation to merge or PDU interleave the multicast data into a Virtual Channel Link (VCL) that is typically (but is not required to be) the CPE to access a node link component of a Virtual Channel Connection (VCC) connecting the CPE to the Service Gateway. Consequently, only one copy of the multicast traffic traverses the ATM access network between the service gateway and the access module, while a plurality of CPEs may be joined to the multicast tree at the access module. Similarly the network topology as viewed from the CPE is unchanged as the topology optimizations performed by combining multicast with merge are effectively transparent to the CPE. Once this connection is established, high bandwidth multicast content originating at the source node is switched to the access module (via well known SVC or SPVC techniques) where it is merged with the CPE to Gateway VCC.

Many of the benefits of multicast are predicated on the notion that certain classes or types of services can be simultaneously delivered to a community of subscribers such as Internet radio, broadcast video or "near video on demand" (staggercast). The techniques embodied in this invention are also applicable to unique service delivery or unicast services such as unique access to content sources, content caches and video on demand.

Internet users now demand music from the Internet in stereo-quality sound and news with a live Web-cast instead of a static headline. Content providers distributing audio and video content, put the contents online and reach a vast and growing user audience via the Web, using technologies, such as Microsoft® Windows Media™, etc. While such technologies permit content providers to focus on delivering content with moving pictures, stereo sound and features like intelligent streaming, the problem of congestion due to high traffic in the network is compounded. As traffic volumes increase, it becomes increasingly important that the networks deliver appropriate levels of service. Quality-of-Service (QoS) management permits network managers to manage applications that demand high quality, such as audio and video playback, real time voice, etc. particularly in times of inevitable congestion or bottleneck.

Different kinds of application layer proxies, such as Web caches, are widely used in the Internet to improve performance. They increase the efficiency of Internet access by caching FTP text and HTTP objects on selected servers. This means network users can have access to popular Internet material quickly since it is loaded from a cache on or near their local network, rather than a distant Internet site, thereby reducing network traffic and congestion. A technique called TCP splicing provides kernel support for data relaying operations, which runs at near router speeds. Servers using TCP splice can sustain a data throughput twice that of normal servers, with significantly improved packet forwarding performance.

Although deployment of the techniques of VC-merge and TCP splicing have significantly improved the delivery of content to DSL subscribers, there exists a need for providing high quality service for obtaining information from a content provider, while rendering the QoS inherent to the ATM access network transparently to a plurality of CPEs connected to an access module.

SUMMARY OF THE INVENTION

An object of the present invention is to provide a method and a system for the efficient provision of content from various content providers to DSL subscribers while supporting transparent QoS capability and bandwidth frugality, using a VC-merge methodology.

In accordance with the present invention, a CPE sends out a request (such as resource ReSerVation Protocol (RSVP), Hyper Text Transfer Protocol (HTTP) or Interior Gateway Multicast Protocol (IGMP)) to a content provider for a particular content. A Service Gateway that serves the CPE intercepts the request and examines it by performing packet snooping. The Service Gateway then determines if the requested content is available from a content provider system that is connected directly to the ATM access network and is capable of originating such content onto the ATM network either as a broadcast, or via subscriber specific service activation mechanisms outside the scope of this invention. In the broadcast or multicast case, the Service Gateway uses ATM proxy signalling to act as the content originator UNI and manipulate the ATM network to add the subscriber to the p2mp tree via a proxy root-initiated join message that contains information specifying merge eligibility, an address of the CPE and a domain identifier. The proxy message will follow the existing routing of the p2mp tree, and will add branches as necessary to reach the access module that serves the CPE. The access module recognizes the merge eligibility of the VCC, terminates the signalling exchange on behalf of the subscriber end system and performs a VC-merge to merge (or PDU interleave) the multicast data into a provisioned Virtual Channel Link (VCL) of the CPE and the content is delivered by the VCL to the designated CPE. In this scenario the access module is required to be merge capable, although other access network nodes are not required to implement this functionality. Since the content is provided using direct ATM connectivity between the hosting platform and the CPE and not though the Service Gateway, congestion at the Service Gateway is reduced. Similarly, as the merge operation eliminates the requirement for the CPE to support call processing directly, QoS is transparently supported.

In the same way that a Service Gateway snoops multicast specific protocol exchanges and manipulates the ATM network accordingly, similar functionality can be extended to content servers (such as video pumps) that are directly connected to the ATM network. The Service Gateway forwards service dialog directly addressed to the content provider using normal routing techniques, and the content provider performs service admission control, etc. The content provider may also create unique service specific VCCs to the subscriber (the VCC Setup message indicating domain specific information and merge eligibility as part of the signaling dialog). In order to perform this function, the server needs awareness that the subscriber is connected to the ATM network. Numerous techniques known to those skilled in the art are available to make this determination (e.g. ATMARP (ATM Address Resolution Protocol) transactions or static configuration based upon subscriber IP address).

As the VCC is routed across the network, any merge capable node encountered inspects a set of pre-existing connections for a subscriber specific connection suitable for merge. If one is encountered, the node proxy terminates the signaling exchange, and configures its switching fabric to merge the new VCC into the existing VCC already going to the subscriber. Note that this is different from the p2mp case in that for p2mp, it is desirable to defer implementing a merge as long as possible when routing a merge eligible VCC. For the point-to-point (p2p), it is desirable to implement the merge as soon as possible when routing a merge eligible VCC.

The advantages of TCP splicing have also been incorporated into the present invention. When a request for a particular Web page is generated from a CPE, a TCP synchronization signal is sent to the Service Gateway, and the Service Gateway sends an Acknowledge (ACK) message back to the CPE acknowledging the request. A TCP dialog is generated from the CPE that contains the HTTP request, which is sent to the Service Gateway. The Service Gateway analyses the request and searches a local cache or cache digest representative of the knowledge available in local caches to determine if the requested Web page is available in the local cache or caches that the gateway has knowledge of. If it is available, the Service Gateway splices the TCP connection to the ATM cache, sending a TCP synchronization signal to a cache server connected directly to the ATM access network, as well as the TCP dialog containing the HTTP request. Upon receiving the HTTP request the cache server sends the requested Web page to the CPE, after setting up a merge-eligible SVC, if required.

The invention therefore permits the transparent provision of QoS to DSL subscribers for content sourced directly from the ATM access network, because the inherent QoS provided in the access network is transparently inherited by the subscriber. The invention also reduces traffic throughout at the Service Gateway, so that overall performance for Internet access is improved.

The role of transparent QoS is to permit highly stateful packet inspection and policy to be performed by Service Gateways while permitting the relatively mundane function of content delivery to be offloaded to simpler platforms subtending the ATM network and taking advantage of capabilities of the ATM network itself, while hiding this complexity from the ATM attached end-system.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

The present invention provides a method and system for providing transparent QoS to subscribers accessing unicast or multicast content using a Digital Subscriber Loop (DSL) and Customer Premise Equipment (CPEs). A VC-merge capable access module provides an interface between an Asynchronous Transfer Mode (ATM) access network and the associated CPEs. Content providers are connected directly to the ATM access network, which offers inherent QoS capability for service delivery, while the VC-merge capable access modules ensure bandwidth frugality in the delivery of multicast services and CPE simplicity.

Figure 1:
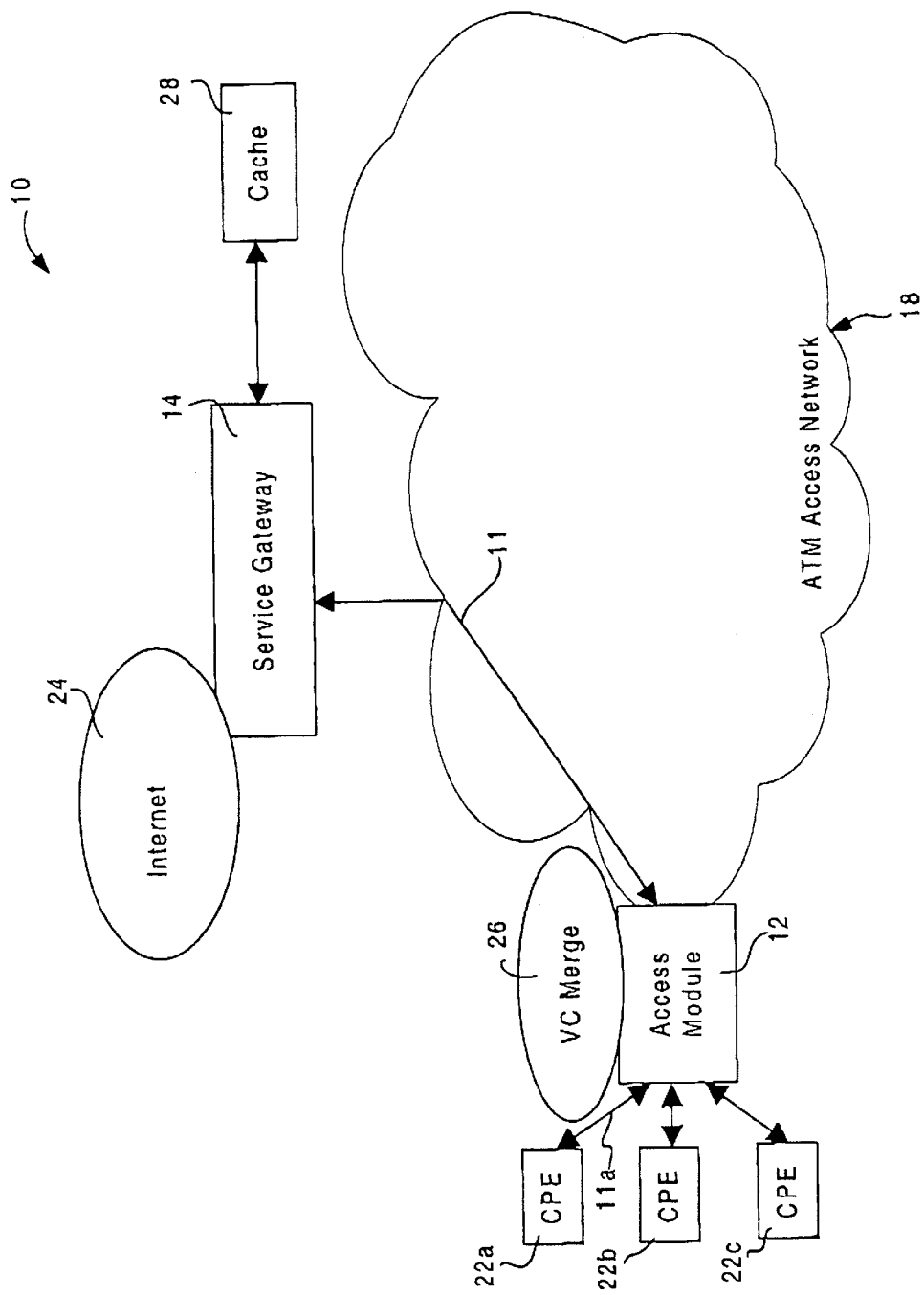
FIG. 1 is a schematic diagram illustrating a prior art ATM access network in which access modules are provisioned with VC-merge capability.

FIG. 1 shows a schematic diagram of a prior art communications network 10 in which VC-merge 26 has been deployed at an access module 12, as described in Applicant's co-pending U.S. patent application Ser. No. 09/648,610 referenced above, the specification of which is incorporated herein by reference. The access module 12 provides an interface between an ATM access network 18 and the CPEs 22a–22c. The network is coupled to an Internet Protocol (IP) network 24 via at least one Service Gateway (SG) 14. The CPEs 22a–22c are connected to the access module 12 via a virtual channel link (VCL), which may be a portion of a Virtual Channel Connection (VCC) 11 that is one of a Switched Virtual Circuit (SVC), a Permanent Virtual Circuit (PVC), a Soft Permanent Virtual Circuit (SPVC), or may be a standalone provisioned VCL, each of which is well known in the art. This arrangement permits each CPEs 22a–22c to obtain high bandwidth access to the Internet 24 through the Service Gateway 14.

When an end user CPE requests multicast content, the CPEs 22a–22c sends a join request message through the ATM access network 18 via the VCC 11 to the Service Gateway 14. On receipt of the Request message, the Service Gateway 14 uses a look-up table to relate the VCC 11 on which the request was received from the CPEs 22a–22c with an address of the access module 12 that supports the VCC 11, to identify an ATM end system address of the CPEs 22a–22c, and the associated access module 12. Thereafter, the Service Gateway 14 joins the CPEs 22a–22c to a multicast source node specified in the request. Once the connection has been established, the requested information is forwarded through the access module 12 to the end user's CPEs 22a–22c via the end user's final VCL 11a.

When a plurality of CPEs 22a–22c request the same information, specifically multicast or broadcast service, the access node is directed via ATM signalling modified as per this invention to replicate the content producing a copy for each CPE and then performing a unique VC-merge per CPE at the access module 12, merging the requested information into a provisioned final Virtual Channel Link (VCL), thereby reducing congestion in the network.

This is described in Applicant's co-pending U.S. patent application Ser. No. 09/648,610 referenced above. As indicated in FIG. 1, if the requested content is hosted at a content provider 16, the content providers may send the content to the access module 12, using a User-to-Network Interface (UNI), which is established at the time of connection setup.

Figure 2:
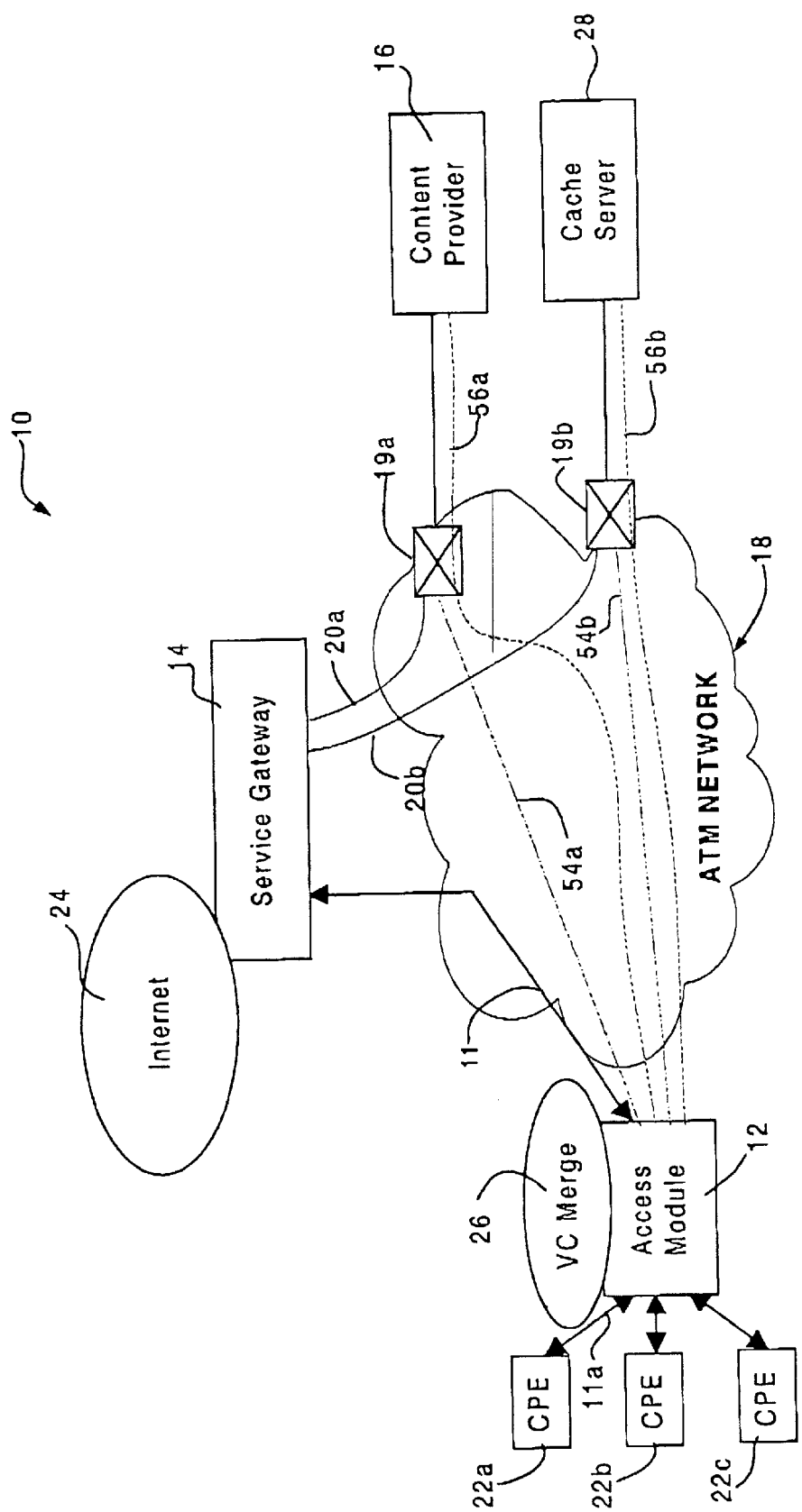
FIG. 2 is a schematic diagram illustrating an ATM access network provisioned in accordance with the invention.

FIG. 2 is a schematic diagram illustrating a network architecture 10 in which the present invention is deployed. The network 10 includes an access module 12 which is connected to an access network 18, typically an Asynchronous Transfer Mode (ATM) network. The access module 12 may be a Digital Subscriber Line Access Multiplexer (DSLAM), cable headend, satellite base station, ATM side of CPE, or optical line termination. The access network 18 is connected by Service Gateway 14 to the Internet 24 in a manner well known in the art. A plurality of subscribers may access the Internet via the access module 12 using Virtual Channel Connections (VCCs), which are a concatenation of Virtual Channel Links (VCLs). Only one of the VCCs 11 is illustrated for the sake of clarity. The VCC 11 terminates in a final VCL 11a.

In accordance with the invention, a plurality of unicast or multicast content providers 16 are connected to the access network 18 by edge switches 19, in a manner well known in the art. For the sake of simplicity of illustration, only one of the content providers 16 is shown. The content providers 16 are thus enabled to provide unicast and multicast content directly via the access network 18, which provides inherent Quality-of-Service (QoS), as will be explained below in more detail. As is also well understood in the art, the Service Gateway 14 stores knowledge of one or more Worldwide Web Page caches 28, which are used to improve performance for Worldwide Web Page requests launched by subscribers using CPEs 22a–22c.

Requests for unicast or multicast content such as streaming video, Web TV, staggercast data, or any other content that requires QoS for subscriber satisfaction may be requested using CPEs 22a–22c. The content is requested by subscribers using CPEs 22a–22c in a manner well known in the art. When a subscriber requests multicast content using CPE 22a, for example, the subscriber may have a browser window open (not shown), and may have engaged in a pre-request dialog during which a billing arrangement was set up in advance. When a request (typically, but not necessarily, an Interior Gateway Multicast Protocol (IGMP) request, or and HTTP request) for content is originated at the CPE 22a, the Service Gateway 14 servicing the CPE 22a intercepts the request and examines the request by performing packet-snooping. The requested content may be sourced from the Internet 24 or a content provider 16, which may or may not have an established connection 56a to the access module 12 in the form of an SPVC or a PVC, for example.

In accordance with the invention, transparent QoS for content delivery is provided to subscribers using CPEs 22a–22c by connecting the content providers 16 directly to the access network 18 and provisioning or signalling VCs between the content providers 16 and the respective access modules 12 connected to the access network 18. If the source of the content is determined to be one of the content providers 16, the Service Gateway 14 responds to the IGMP or HTTP request by performing policy and billing verification, if required. In accordance with the invention, the Service Gateway 14 may be a policy and billing authority that performs policy and billing functions for the content providers 16. As is well understood by those skilled in the art, the Service Gateway 14 may also simply forward requests to the end systems of the content providers 16, which perform policy and billing functions. If the request is for multicast content, after request verification, the Service Gateway sends a proxy point-to-multipoint root-initiated join message on behalf of the content source's UNI through a User Network Interface (UNI) signaling path to an edge switch connected to the content providers. The edge switch forwards the join message through the access network toward the CPE 22a via well understood ATM routing and signalling mechanisms. The proxy message includes a merge-eligibility indicator, as will be explained below in more detail. The message is sent using a User Network Interface (UNI) signaling connection 20a provisioned between the Service Gateway 14 and the content provider 16. Consequently, the proxy message is delivered to the ATM edge switch 19a connected to the identified content provider 16, and appears to the access network 18 to have originated from the content provider's ATM end system 16.

The proxy message contains normal ATM signalling information (e.g. the CPE's address, TM and QoS parameters), and for the purposes of this invention, the signalling has been augmented with a merge-eligibility indicator referred to above, and a domain identifier, which identifies the subscriber's Internet Service Provider (ISP), for example. The proxy message is forwarded from the edge switch 19a across the access network 18 to the access module 12 following the p2mp tree routing, and adding branches as necessary if the access module is not already at the end of a branch in the multicast tree that is rooted at the content provider 16. On receipt of the proxy message, the access module 12, which is a VC-merge enabled node, determines that the proxy message includes a merge-eligibility indicator and is able to establish the suitability of merging the new connection with existing connections to the CPE. Once this determination has been made, the access module configures itself appropriately to VC-merge (PDU interleave) the incoming call onto an existing merge eligible connection, and responds to the signalling exchange from the content provider on behalf of the CPE.

Since the content is delivered directly through the access network 18 to the access module 12, and is VC-merged into the final VCL 11a by the access module 12, congestion at the Service Gateway 14 is significantly reduced, thereby improving the efficiency of the Service Gateway 14. Furthermore, since the VC-merge is performed at the access module 12, rather than establishing leaves for each CPE from the access network, the efficiency of the access network 18 is also improved and the CPE 22a is not confused by multiple VCs and does not require significant exchange to coordinate the ATM and application layers. In addition, the access network 18 can provide service specific QoS due to the capabilities of the ATM protocol. Since the multicast content is sourced form a content provider connected directly to the access network 18, but is delivered over pre-existing connectivity to the CPE, QoS is transparently provided to the subscriber. The level of QoS is dependent, of course, on the QoS associated with the VC 56a, arranged by the content provider 16. Techniques exist (using ATM management capabilities such as ILMI (Integrated Local Management Interface) to permit the characteristics of the access node to CPE VCL 11a to be modified in response to connection merge activity at the access module, but this invention is not dependent on this capability, simply augmented by it.

Figure 3:
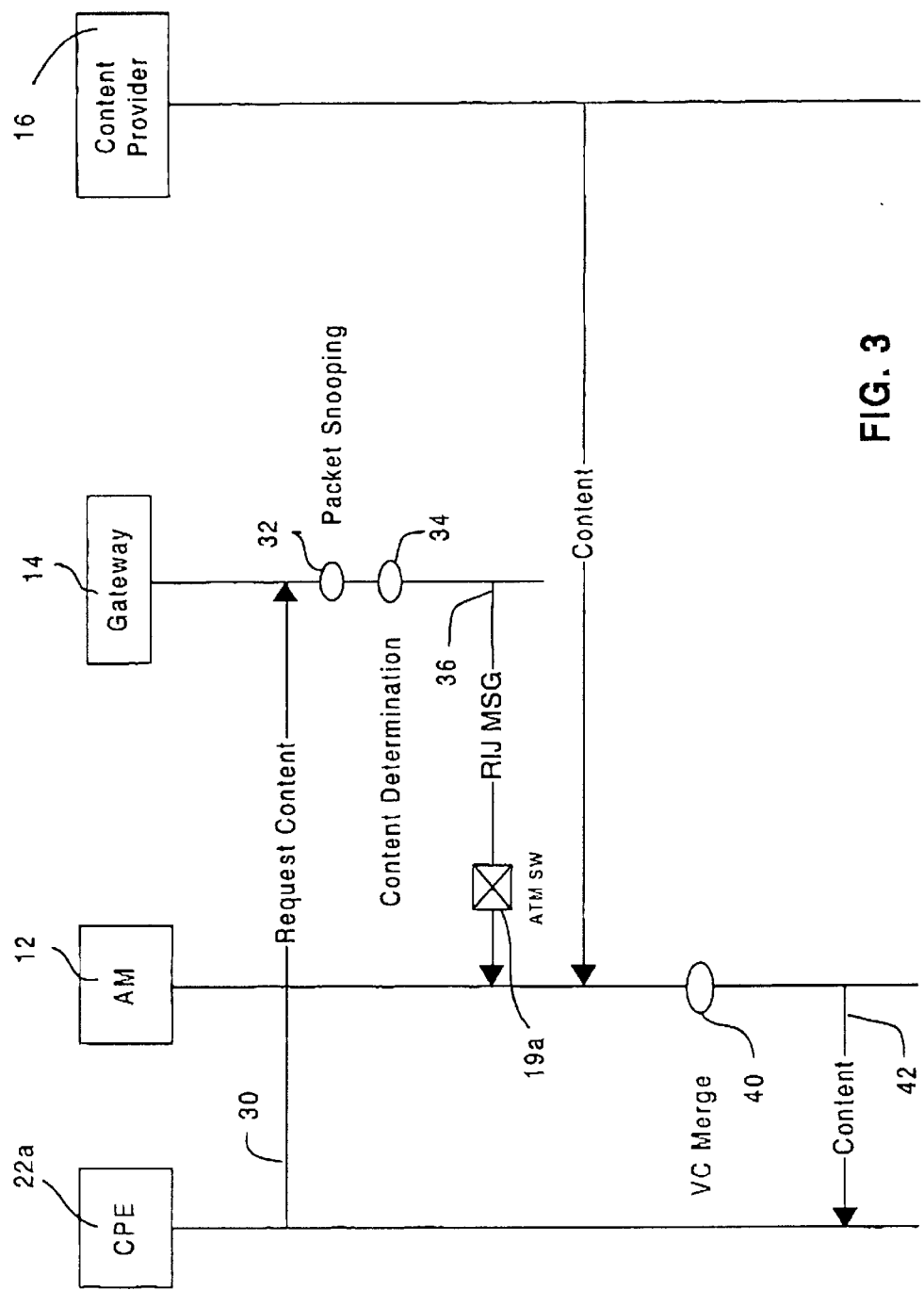
FIG. 3 is a message flow diagram schematically illustrating the principal messages exchanged between the CPEs, the Service Gateway and the content provider.

FIG. 3 is a message flow diagram illustrating the principal messages exchanged during the setup of a connection between the subscriber's CPE 22a and a multicast content provider 16 over an ATM access network 18. Those skilled in the art will understand that requests for unicast content can also be processed using the methods and system in accordance with the invention.

As shown in FIG. 3, the CPE 22a sends an IGMP message requesting a specific content to the Service Gateway 14 (step 30). The Service Gateway 14 examines the message by performing packet snooping (step 32). On determining that the request is a request for multicast content (step 34), the Service Gateway 14 formulates a proxy message requesting a root-initiated join, which is forwarded via the UNI connection 20a (FIG. 2) to the ATM edge switch 19a. The edge switch 19a then forwards the proxy message (step 36) through the ATM network, as explained above.

When the access module 12 receives the proxy signalling message, it examines the message and determines that the message contains the merge-eligibility indicator. Therefore, rather than forward the signalling message to the CPE 22a (which would result in the establishment of an additional VCL between the access module and the CPE), the access module 12 terminates the ATM signaling and configures itself to perform VC-merge (step 40) to merge the PDUs of multicast content from the p2mp VCC into the final VCL 11a of the existing merge eligible VCC. The content is therefore delivered to the CPE 22a (step 42).

Although the example presented above describes the Service Gateway 14 as the policy and billing authority, it will be understood by those skilled in the art that the Service Gateway 14 could also be configured to serve as a simple relay that forwards content requests to content provider 16 end systems. If so, the content provider end equipment systems perform policy and billing functions in a manner well known in the art. In that case, the Service Gateway 14 forwards the request over the UNI connection 20a to the content provider 16, and the content provider 16 generates the route-initiated join message after policy issues are settled and, if required, billing arrangements have been made. The content delivery and the VC-merge of the content into the final VCL 11a of CPE 22a is identical to that described above. The subscriber therefore benefits from the QoS associated with the content delivery.

In the same way that a Service Gateway 14 snoops multicast specific protocol exchanges and manipulates the ATM access network accordingly, similar functionality can be extended to content provider 16 end systems (such as video pumps) that are directly connected to the ATM access network. The Service Gateway 14 forwards service dialog directly addressed to the content provider 16 end system using normal routing techniques, and the content provider 16 end system performs service admission control, etc., and may create unique service specific VCCs (not shown) to the subscriber (indicating domain specific information and merge eligibility as part of the signaling dialog). In order to perform this function, the content provider 16 end system requires awareness that the subscriber CPE 22a is connected to the ATM access network is. Numerous techniques known to those skilled in the art are available to make this determination (e.g. ATMARP (ATM Address Resolution Protocol) transactions or static configuration based upon subscriber IP address).

As a VCC is routed across the ATM access network 18, any merge capable node encountered inspects a set of pre-existing connections for a subscriber specific connection suitable for merge. If one is encountered, a node proxy terminates the signaling exchange, and configures its switching fabric to merge the new VCC into the existing VCC 11 already provisioned to the subscriber CPE 22a. Note that this is different from the p2mp case in that for p2mp, it is desirable to defer implementing a VC-merge as long as possible when routing a merge eligible VCC. For the p2p (point-to-point) connection, it is desirable to implement the VC-merge as soon as possible when routing a merge eligible VCC.

As is familiar to those skilled in the art, the practice of "Web caching" is widely used in the Internet in order to improve network performance. Web caching is a technique in which requested Worldwide Web pages are stored (cached) at selected routers on the theory that the same pages will be requested again. When a Web page request is received at a caching router, the cache is checked to determine whether the page is available locally before the request is forwarded through the network. Thus network performance is enhanced by sourcing substantially static content like Web pages as near to a sink node as possible.

Web caching has been further improved by a more recent advance known as "TCP splicing". In TCP splicing, if a caching router, a firewall for example, proxies as a source node when a TCP dialog is initiated prior to a content (HTTP) request. When the content request is received, the caching router checks its cache for the requested content (Web page) and if the page is cached, the router returns the page in response to the request. If, however, the page is not in cache, the caching router proxies as the sink node to the source node in order to retrieve the desired page more efficiently, as will be described below in more detail.

Figure 4:
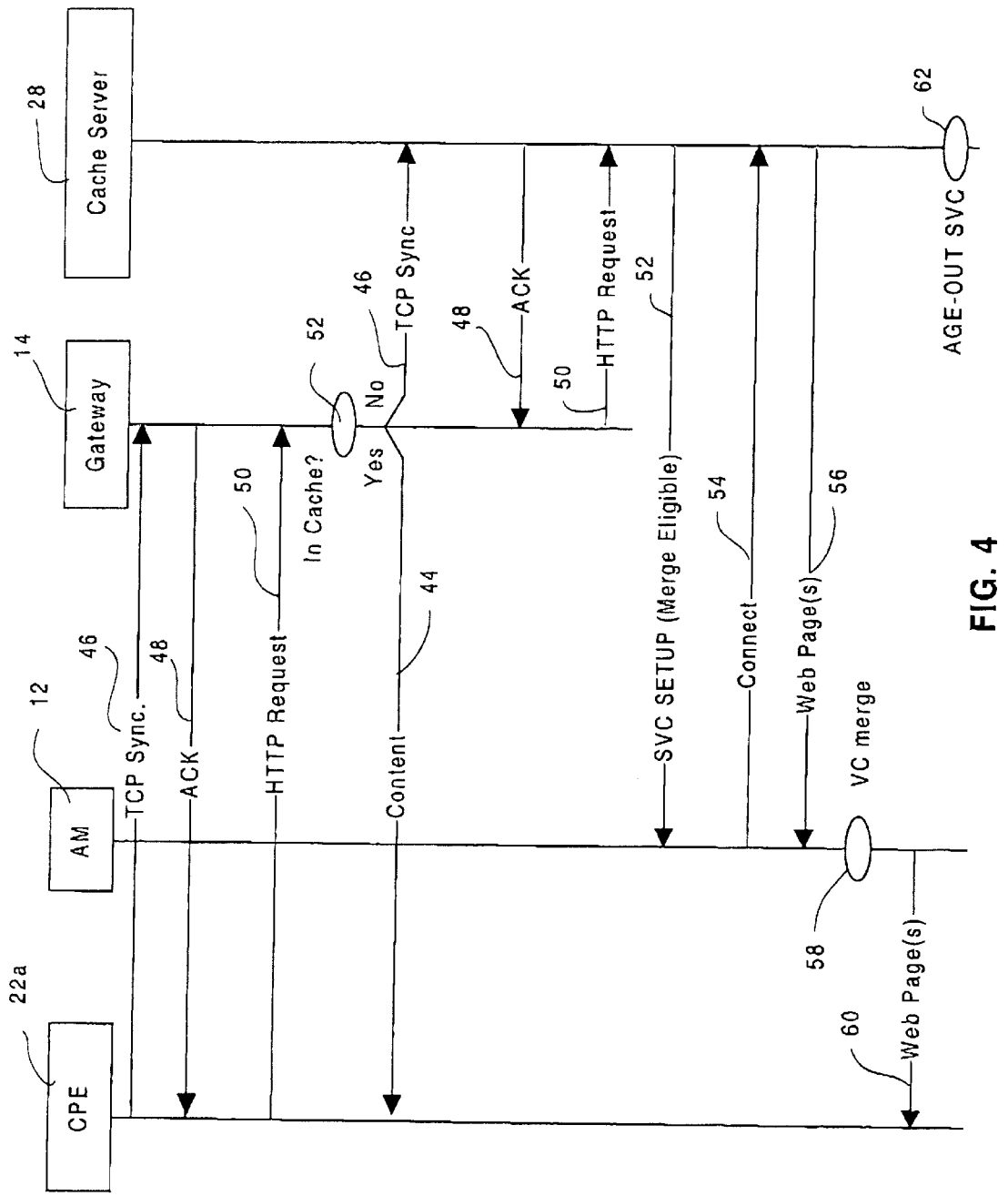
FIG. 4 is a message flow diagram schematically illustrating principal messages exchanged when TCP splicing is deployed using the methods in accordance with the present invention, It will be noted that throughout the appended drawings, like features are identified by like reference numerals.

The technique of TCP splicing has been incorporated into the present invention in order to further improve packet forwarding performance through the Service Gateway 14. The use of TCP splicing in accordance with the invention is explained below with reference to FIG. 4. When a request for a Web page is generated from CPE 22a, a TCP synchronization signal (TCP sync) is sent to the Service Gateway 14 (step 46). The Service Gateway 14 acts as a proxy for the intended source and acknowledges the request by returning an ACK signal (step 48) back to the CPE 22a. A TCP dialog is generated by the CPE 22a that contains an (HTTP) request which is sent to the Service Gateway 14 (step 50). The Service Gateway 14 analyzes the (HTTP) request and searches its cache digest representative of knowledge available in local caches to determine if the requested Web page is available (step 52). In accordance with the invention, a cache server 28, for example, connected directly to the access network 18 maintains an extended cache. The Service Gateway 14 passes copies of requested Web pages to the cache server 28 over the UNI connection 20b and the pages are stored by the cache server 28. The Service Gateway 14 therefore maintains a record, a table for example, of pages cached by the cache server 28 if the requested page is in the cache. Consequently, when the requested page is in the cache, Service Gateway 14 performs TCP splicing to satisfy the request form the cache server 28. To accomplish this, the Service Gateway 14 acts as a proxy for CPE 22a and sends a TCP synchronization signal (step 46), and the TCP dialog containing the (HTTP) request (step 50) directly to the cache server 28, where the requested Web page is available. Upon receiving and analyzing the (HTTP) request, the cache server 28 determines whether a connection to the CPE 22a exists. In this example, a connection does not exist and the cache server 28 sends an SVC setup message (step 52) to the CPE 22a. The SVC setup message carries a merge-eligibility indicator, which, when it reaches the access module 12, causes the access module 12 to terminate the ATM signaling and perform a VC-merge, as described above. The access module then returns a connect message (step 54) to the cache server 28. The cache server 28 responds by sending the requested content (step 56) to the access module 12. The VC-merge of the content into the VCL 11a is performed at the access module 12 (step 58) and the CPE 22a receives the content merged into the VCL 11a in step 60. Once the SVC is set up in step 52, it can be used to deliver cached web pages to the CPE 22 until it is "aged-out" in step 62 by the cache server 28, as shown at 62. As is well understood in the art, when the SVC is aged-out, is released (not shown) by the cache server in a manner well known in the art.

The invention therefore provides methods and systems for transparently providing QoS to DSL subscribers for selected services available through the ATM access network 18. The invention also reduces through traffic at the Service Gateway 14, so overall performance is improved. Although the invention has been explained with reference to multicast content delivery and TCP splicing, it will be understood by persons skilled in the art that these are only two of a broad range of applications in which the invention may used.

The embodiments described above are therefore intended to be illustrative only. The scope of the invention is intended to be limited solely by the scope of the appended claims.

We claim:

1. A method of providing transparent Quality of Service (QoS) to at least one subscriber CPE connected to an ATM access network via an access module adapted to perform a Virtual Channel (VC) merge, the method comprising the steps of:
   a) intercepting a request for content at a Service Gateway that services the CPE;
   b) examining the request at the Service Gateway by performing packet snooping, and responding to the request with a proxy message that includes a merge-eligibility indicator;
   c) forwarding the proxy message to the access module via an ATM edge switch that is connected to a provider of the content; and
   d) performing a VC-merge to merge the content into a virtual channel connection (VCC) provisioned for the CPE.

2. A method as claimed in claim 1, wherein the proxy message is a point-to-multipoint root-initiated join proxy message.

3. A method as claimed in claim 2, wherein the proxy message is a Hyper Text Transfer Protocol (HTTP) proxy message.

4. A method as claimed in claim 1, wherein the VC-merge is performed at an access module that serves the CPE.

5. A method as claimed in claim 3, wherein the VC-merge is performed at a node in the ATM access network.

6. A method as claimed in claim 2, wherein the root-initiated join message includes an address of the CPE, and a domain identifier.

7. A method as claimed in claim 2, wherein the request originating from the CPE is an Interior Gateway Multicast Protocol (IGMP) message.

8. A method as claimed in claim 1, further comprising a step of identifying a location of the requested content at the Service Gateway using a look-up table.

9. A method as claimed in claim 2, wherein the root-initiated join message is sent from the Service Gateway to the ATM edge switch over one of a pre-provisioned soft permanent virtual circuit (SPVC) and a permanent virtual circuit (PVC).

10. A method as claimed in claim 9, wherein the root-initiated join message contains an address of the CPE, a merge-eligibility indicator, and a domain identifier.

11. A method as claimed in claim 1, wherein the content provider is connected to the access module by a provisioned permanent virtual circuit (PVC).

12. A method as claimed in claim 1, wherein the content provider is connected to the access module by a switched virtual circuit (SVC) established by the content provider when the request for content is received.

13. A method as claimed in claim 1, wherein the access module is one of a Digital Subscriber Line Access Multiplexer (DSLAM), cable headend, satellite base station, ATM side of Customer Premise Equipment (CPE) and optical line termination.

14. A system for providing transparent Quality of Service (QoS) to at least one subscriber's CPE connected to an ATM access network via an access module associated with the CPE adaptable to perform Virtual Channel (VC) merge, the system comprising:

a) means for intercepting a request for content at a Service Gateway that services the CPE;
   b) means for examining the request at the Service Gateway by performing packet snooping, and for responding to the request with a proxy message that includes a merge-eligibility indicator;
   c) means for forwarding the proxy message to the access module via an ATM edge switch that is connected to a provider of the content; and
   d) means for performing a VC-merge to merge the content into a VC provisioned for the CPE.

15. A system as claimed in claim 14, wherein the proxy message is a root-initiated join message that includes a merge-eligibility indicator, an address of the CPE, and a domain identifier.

16. A system as claimed in claim 14, wherein the request message originating from the CPE is one of an Interior Gateway Multicast Protocol (IGMP) and a Hyper Text Transfer Protocol (HTTP) message.

17. A system as claimed in claim 14, further comprising means for identifying a location of the requested content by the Service Gateway at a content provider by using a look-up table.

18. A system as claimed in claim 14, further including a caching server connected to the ATM access network.

19. A system as claimed in claim 15, further comprising means for sending the root-initiated join message from the Service Gateway to the ATM edge switch over a pre-provisioned SPVC or a PVC.

20. A system as claimed in claim 19, wherein the root-initiated join message contains information, such as subscriber address, a merge-eligibility indicator and a domain identifier.

21. A system as claimed in claim 14, wherein the content provider is connected to the access module by a pre-provisioned PVC.

22. A system as claimed in claim 14, wherein the content provider is adapted to connect to the access module by establishing a signaled virtual circuit (VC).

23. A system as claimed in claim 15, wherein the means for performing the VC-merge further comprises means for analyzing the root-initiated join message to determine an address of the CPE and the Virtual Circuit Link (VCL) associated with the CPE, and means for forwarding the content from the content provider to the CPE by merging the content into the VCL.

24. A system as claimed in claim 14, wherein the access module is one of a Digital Subscriber Line Access Multiplexer (DSLAM), cable headend, satellite base station, ATM side of Customer Premise Equipment (CPE) and optical line termination.

25. A method of performing TCP splicing in at an Internet Protocol (IP) Service Gateway for Digital Subscriber Line (DSL) subscribers connected to an access network by an access module, comprising the steps of:

a) receiving a Hyper Text Transport Protocol (HTTP) dialog request at the Service Gateway from one of the subscribers, the HTTP dialog requesting a worldwide web page;
   b) sending a proxy message to a cache server connected to the access networks;
   c) responding to the proxy message at the cache server by setting up a merge-eligible switched virtual circuit (SVC) to the access module that serves customer premise equipment (CPE) of the subscriber;
   d) and sending the worldwide web page data via the SVC to the access module, which merges the data into a merge eligible virtual circuit link (VCL) provisioned for the CPE.

26. A method as claimed in claim 25 wherein the SVC is used to forward cached web pages subsequently requested from the CPE.

27. A method as claimed in claim 26 wherein the SVC is released after a predetermined period of inactivity.

* * * * *